US008911635B2

(12) United States Patent
Capela Moraes et al.

(10) Patent No.: US 8,911,635 B2
(45) Date of Patent: Dec. 16, 2014

(54) HYDROCYCLONE FOR THE SEPARATION OF FLUIDS

(75) Inventors: Carlos Alberto Capela Moraes, Niterói (BR); Darley Carrijo De Melo, Barra Da Tijuca (BR); Luiz Philipe Martinez Marins, Flamengo (BR); Fabricio Soares Da Silva, Petrópolis (BR)

(73) Assignee: Petroleo Brasileiro S.A.—Petrobras, Rio de Janeiro (BR)

( * ) Notice: Subject to any disclaimer, the term of this patent is extended or adjusted under 35 U.S.C. 154(b) by 465 days.

(21) Appl. No.: 13/383,496

(22) PCT Filed: Aug. 31, 2009

(86) PCT No.: PCT/BR2009/000265
§ 371 (c)(1),
(2), (4) Date: Jan. 11, 2012

(87) PCT Pub. No.: WO2011/022791
PCT Pub. Date: Mar. 3, 2011

(65) Prior Publication Data
US 2012/0118818 A1    May 17, 2012

(51) Int. Cl.
*B04C 5/081* (2006.01)
*B04C 5/04* (2006.01)
*B04C 5/13* (2006.01)
*B01D 17/038* (2006.01)
*B01D 17/02* (2006.01)

(52) U.S. Cl.
CPC .............. *B01D 17/0217* (2013.01); *B04C 5/04* (2013.01); *B04C 5/081* (2013.01); *B04C 5/13* (2013.01)
USPC ......... 210/788; 210/512.1; 209/727; 209/734

(58) Field of Classification Search
USPC ................. 210/512.1, 788; 209/727, 734
See application file for complete search history.

(56) References Cited

U.S. PATENT DOCUMENTS

| 5,110,471 A | 5/1992 | Kalnins |
| 5,240,115 A * | 8/1993 | Crossley et al. ........... 210/512.1 |

(Continued)

FOREIGN PATENT DOCUMENTS

| BR | 9301111 | 10/1994 |
| EP | 1502652 | 2/2005 |
| WO | WO 92/04123 | 3/1992 |

OTHER PUBLICATIONS

International Search Report for PCT/BR2009/000265, mailed Dec. 2, 2009.

(Continued)

*Primary Examiner* — David A Reifsnyder
(74) *Attorney, Agent, or Firm* — Nixon & Vanderhye, P.C.

(57) ABSTRACT

It is disclosed a hydrocyclone type separator having small dimensions for possessing high capacity for fluid processing by virtue of structural characteristics for feeding, of an upper outlet orifice (overflow) and of a lower outlet orifice (underflow). The feeding comprises two equal channels (18), diametrically opposed and curved, wherein the transverse cross sectional area gradually diminishes for accelerating the two phase fluid stream in a moderate manner. The possibility of the connection of interchangeable devices (2) and (6) to the upper outlet orifice (13) permits changing the diameter of said outlet orifice and, in this manner, altering the hydrodynamic characteristics of the hydrocyclone and increasing the capacity of same to operational ranges suitable for fluid flows having high oil content, medium oil content and low oil content. The presence of a continuously adjustable valve (7) in the area of the lower outlet permits increasing the operational range of the hydrocyclone, even under conditions of high pressure drop and counter pressure in the upper outlet, where there would be a tendency to reflux at said outlet.

4 Claims, 5 Drawing Sheets

(56) References Cited

U.S. PATENT DOCUMENTS

| | | |
|---|---|---|
| 5,637,234 A | 6/1997 | McCasland |
| 5,858,237 A | 1/1999 | Hashmi et al. |
| 6,409,808 B1 | 6/2002 | Chamberlain et al. |
| 6,743,359 B1 | 6/2004 | Smyth et al. |
| 6,968,901 B2 | 11/2005 | Edmondson |
| 7,011,219 B2 | 3/2006 | Knox-Holmes et al. |
| 2005/0016904 A1 | 1/2005 | Knox-Holmes et al. |

OTHER PUBLICATIONS

Foreign-language Written Opinion of the International Searching Authority for PCT/BR2009/000265, mailed Dec. 2, 2009.

* cited by examiner

HYDROCYCLONE FOR THE SEPARATION OF FLUIDS

This application is the U.S. national phase of International Application No. PCT/BR2009/000265, filed 31 Aug. 2009, which designated the U.S., the entire contents of which hereby incorporated by reference.

FIELD OF THE INVENTION

The present invention lies in the field of equipment for the separation of fluids streams having more than one phase. More particularly it is applied for production of fluids, from petroleum producing wells, having two phases, substantially oil and water.

BASIS OF THE INVENTION

The most conventional manner for primary processing a two phase streams of high oil content involves passage of the stream through gravity separators.

A typical configuration for this type of equipment comprises a relatively long and narrow tank having an inlet pipe located in the upper part of one of the extremities thereof through which the two phase mixture enters in a continuous flow. During the passage thereof through the tank the phases separate by virtue of the difference between the specific gravities thereof and on reaching the other extremity of the tank said phases are removed in the following manner: the light phase through a first outlet pipe in the upper part of the tank and the heavy phase through a second outlet pipe in the lower part of the tank.

Should processing of heavy oils be necessary, to be efficient such equipment requires large dimensions, occupying great areas which could be better utilised. In the case of petroleum exploration in the ocean the situation is aggravated by virtue of the relatively small area on the decks of floating production units, which may entail the risk of possible overloading.

Gravity separators are also unsuitable for utilisation in subsea separation operations in deep water. By virtue of the very high external pressure the shells of such tanks would have to be very thick walls, generating problems in terms of construction and installation as a consequence of the very great weight of the equipment.

Hydrocyclones represent separation equipment originally designed for separations of the solid/liquid type, however they have been applied in different branches of industry and have been demonstrated to be efficient in many applications wherein liquid/liquid separation is required.

The general operating principle of a hydrocyclone is a high speed applied to the two mixed substances such as to separate them by virtue of the difference in value between their specific gravities.

In terms of the configuration of the equipment, in general it presents a substantially conical shape having a small diameter at one extremity, the fluid inlet, funnelling down to an outlet extremity for the separated heavy phase having an even smaller diameter. The substantially conical shape and tangential feed to the wall are responsible for providing the velocities required for separation.

In order to generate the speed and the centrifugal force required for the separation of two substances, traditional hydrocyclones utilise a tangential fluid inlet opening to the substantially conical cross section of the body of the hydrocyclone.

This type of tangential inlet feeding acts, in practice, as a jet of fluid threw against a curved wall. Having completed a first circuit at speed this fluid reencounters the inlet fluid generating very great turbulence, resulting in phase dispersion, being more pronounced the greater the oil phase content of the fluid.

The region aligned with the longitudinal axis of the hydrocyclone is normally referred to as the central nucleus. It is within this central nucleus that the separated lighter phase accumulates, requiring very rapid stabilisation by virtue of the fact that the outlet thereof is on the same side and proximate to the inlet of the fluid to be separated.

For this to occur the creation of a high speed spiralling movement is necessary. It is the conversion of the feed pressure into rotational kinetic energy which governs the efficiency of a hydrocyclone. The better this conversion, that is to say the greater the loss of pressure by the fluid within the hydrocyclone, the greater the efficiency thereof. On the other hand, localised pressure drops require minimisation by virtue of the fact that they generate turbulence and, as a consequence, mixing of the separated phases.

Hydrocyclones represent equipment which is more compact than conventional gravity separators, being of lower weight, not containing moving parts, having low maintenance cost and being capable of exhibiting great efficiency.

Furthermore, the same offer flexibility in installation, which may be on the deck of a floating production unit or as subsea processing equipment.

The dimensional characteristics and operational simplicity of hydrocyclones result in the same being among the preferred equipment for separation operations under sea floor conditions, principally by virtue of the fact that they may be disposed within vessels of small diameter requiring thinner walls.

Traditional hydrocyclones utilised in petroleum production are, however, dimensioned to process oily water wherein the oil content is lower than 0.2%.

The greatest difficulty with conventional cyclones, in design terms, is the dependence thereof on the characteristics of the fluid stream to be separated in terms of the proportion of the constituents thereof.

RELATED ART

Several documents exist which may serve as examples of the development of the art of separation of a mixture of fluids the constituents whereof may be separated into different phases by virtue of the latter having different specific gravities.

Document U.S. Pat. No. 5,637,234 (Edwin D. McCasland), incorporated herein for reference purposes, discloses an apparatus and a method for the separation of a mixture of fluids having different specific gravities, such as oil and water. The method comprises separating the mixture into different streams and discharging the multiple streams into a vessel beneath the water surface, directing the multiple streams against a baffle plate having a vertical surface within the vessel, in this manner increasing the rates at which the fluids may be separated. The separator comprises a vessel, a baffle plate having a vertical surface within the vessel, an inlet for distributing the mixture of fluids within the vessel, a distribution means connected to said inlet for the separation of the mixture into multiple streams, and a point for discharging said multiple streams located beneath the surface of the heavier fluid, generally water, against the baffle plate. The heavier fluid is maintained at a given level by a separator plate located behind the baffle plate. The lighter fluid is removed by a drain directly above the surface of the heavier fluid, whilst the heaviest fluid may be removed from the bottom of the vessel behind the baffle plate.

Document U.S. Pat. No. 6,968,901 (Jerry M. Edmondson), incorporated herein for reference purposes, discloses a method and means for oil production processing where it is necessary to install the equipment, in which the process will be carried out on floating structures subject to wave-induced movement. More particularly, in comparison with horizontal processing vessels of the art, the invention declares there to be advantage in the use of vertical cylindrical vessels including internal structures obliging the fluid to follow a horizontal flow pattern but experiencing very little interference from oscillating movements of the floating structure and occupying less space.

Document U.S. Pat. No. 6,409,808 (Neville Paul Chamberlain et al.), incorporated herein for reference purposes, discloses gravity separation equipment including therewithin a vessel wherein a mixture containing oil and water may be separated by gravity to form discrete layers of oil and water. The vessel has an internal assembly including a separator of cyclone type for the separation of the inlet fluid stream into a gas phase and a liquid phase, where the liquid phase is led, subsequent to the cyclone, to a region of the separator vessel by gravity above the water layer.

Document U.S. Pat. No. 5,858,237 (Khalid A. Hashmi et al.), incorporated herein for reference purposes, discloses a separator of the hydrocyclone type for the separation of immiscible fluids and removing suspended solids. Hydrocyclones in general comprise a first cylindrical portion having an open lower and a further closed upper extremity. In the closed extremity there is disposed a fluid outlet (overflow) aligned with the longitudinal axis of the hydrocyclone and, associated with said outlet, there is installed a movable member in the form of a circular plate having a plurality of orifices of a diameter progressively smaller than the diameter of the outlet orifice. This plate may be moved manually or by motor and gears such that each orifice may be axially aligned with the outlet orifice. The separator furthermore includes at least two balanced radial fluid injection inlets in said cylindrical portion adjacent to the closed extremity. A second convergent tapered section having open extremities is axially connected to the open extremity of the first section and a third section, also being convergent and tapered, is axially connected to the second section, followed by a fourth section axially connected to the third section. The separator preferably utilises two, three or four radially balanced fluid inlets. Said inlets are installed tangentially such as to rapidly promote a vortex, generating flow stability with less turbulence and loss of energy, and improved separation efficiency.

The art lacks hydrocyclone capable of processing fluid streams having high, medium and low oil content without the inconvenience characteristics of conventional cyclones in design terms, that is to say dependence on the characteristics of the fluid stream to be separated in respect of the proportion of the constituents thereof and the presence of regions wherein localised pressure losses may cause deformation and rupture of the globules of the dispersed phase.

SUMMARY OF THE INVENTION

An objective of the present invention is an equipment for the separation of fluids being a compact alternative to conventional primary separators, principally in the scenario of the development of mature petroleum basin wherein the production of water attains considerable volumes requiring solutions of easy and rapid implementation, both in units already in existence and in subsea systems.

The objective of the present invention is achieved through a hydrocyclone type separator of small dimensions having a high fluid processing capacity by virtue of structural characteristics introduced for feed, into the upper outlet orifice (overflow) and into the lower outlet orifice (undertow).

The feed has a configuration comprising two equal diametrically opposed curved channels whereof the cross sectional area gradually diminishes such as to gently accelerate the two phase fluid stream, considerably minimising pressure losses localised in the inlet section.

The possibility of connecting interchangeable parts to the upper outlet orifice permits changing the diameter of said outlet orifice and, in this manner, altering the hydrodynamic characteristics of the equipment and increasing the capacity of the same equipment to achieve operational levels appropriate to fluid flows having high oil content, medium oil content and low oil content.

In an embodiment suitable for processing low oil contents, the hydrocyclone is furthermore equipped with a valve connected to the lower outlet to permit continuous variation in this outlet orifice and, consequently, to ensure an outlet flow through the upper outlet orifice (overflow) even under conditions in which the pressures in this region are low.

BRIEF DESCRIPTION OF THE DRAWINGS

The characteristics of the hydrocyclone for the separation of fluids, which is the object of the present invention, will be better comprehended through the detailed description below which will be provided, in association with the following drawings which are referred to, merely as examples, and which same form an integral part of this specification.

DETAILED DESCRIPTION OF THE INVENTION

The detailed description of the hydrocyclone for the separation of fluids, which is the object of the present invention, will be provided in accordance with the identification of the components thereof based on the aforedescribed figures.

The present invention refers to hydrocyclone having small dimensions and high capacity for fluid processing by virtue of structural characteristics for feeding, of an upper outlet orifice (overflow) and of a lower outlet orifice (underflow).

Figure 1:
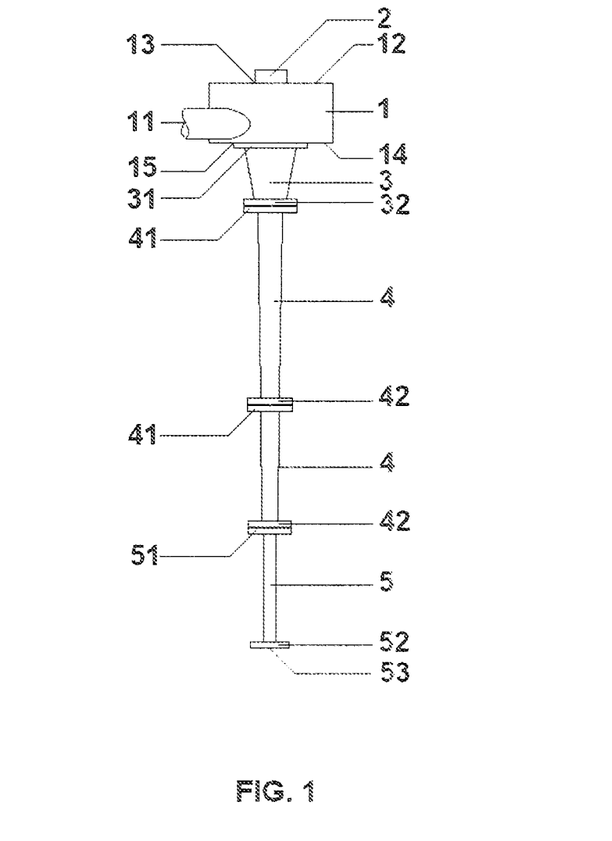
FIG. 1 is a representation of a first embodiment of a hydrocyclone, according to the present invention, suitable for the separation of a fluid flow having high oil content or having medium oil content.

The hydrocyclone which is the object of the present invention may be observed in FIG. 1 in an embodiment for fluid streams of high oil content and medium oil content, and it comprises:

a fluid feed section (1), substantially cylindrical, having at least one tangential fluid inlet (11); closed in the upper circular surface thereof (12), with an outlet orifice (13)

Figure 2A:
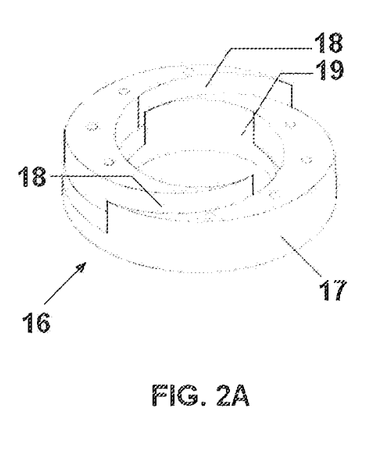
FIGS. 2A and 2B are representations of a feed head of the present invention as a perspective view and a plan view, respectively.
Figure 2B:
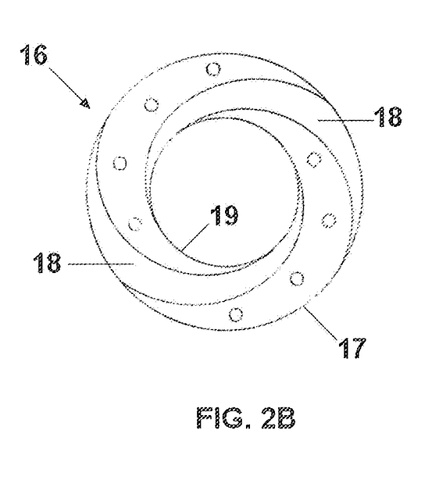
Figure 3:
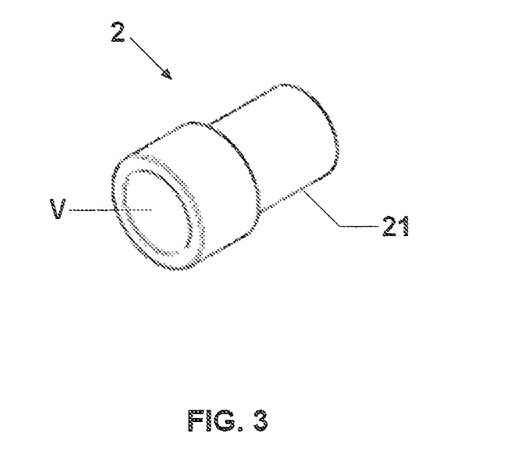
FIG. 3 is a representation of a first light phase outlet control device suitable for a fluid flow having high oil content or medium oil content.

(overflow) in the central region for a light phase outlet; partly closed at its lower circular surface (14) whereon, in the central region, it is disposed a seat (15) for connecting a flange, and housing there within a feed head (16), shown in detail in FIGS. 2A and 2B. The feed head (16) has a cylindrical ring shape of smaller dimensions than feed section (1), defining an annular space between the wall of feed section (1) and external surface (17) of said feed head (16), and at least two equal channels (18), opposed diametrically and curved, extending from the external surface to internal surface (19) of said feed head (16) in the direction of the centre of the latter, and wherein the transversal cross sectional area of said channels (18) gradually diminishes for accelerating the fluid stream in a moderate manner and to introduce it within the hydrocyclone;

a first light phase outlet control device (2) in the form of a hollow (V) interchangeable divide that may have different diameters which may be observed in a possible suggested embodiment in FIG. 3, having external diameter (21) suitable for insertion into light phase outlet orifice (13) (overflow) permitting, by means of a specific diameter, a selection of the hydrodynamic characteristics of the hydrocyclone and to adapt at the range of use thereof in accordance with a fluid stream;

an acute conical section (3) having a first flange (31) with the larger internal opening diameter thereof being connected to seat (15) of feed section (1), and a second flange (32), having the smaller internal opening, serving to initiate formation of a vortex following the acceleration the fluid within the feed head (1);

at least one moderate conical section (4) having a third flange (41) with the larger internal opening diameter thereof being connected to the second flange (32) of acute conical section (3), a fourth flange (42) having a smaller internal opening diameter, and having a length exceeding that of the acute conical section (3); the section for propagation of the vortex and increasing the separation of both the heavier phase and of the lighter phase;

a final cylindrical section (5) having a fifth flange (51) connected to the fourth flange (42) of moderate conical section (4), and a sixth flange (52) having the same internal opening diameter as the fifth flange (51); the section for concentrating the heavier phase on removal thereof through lower outlet (underflow) (53).

Figure 4:
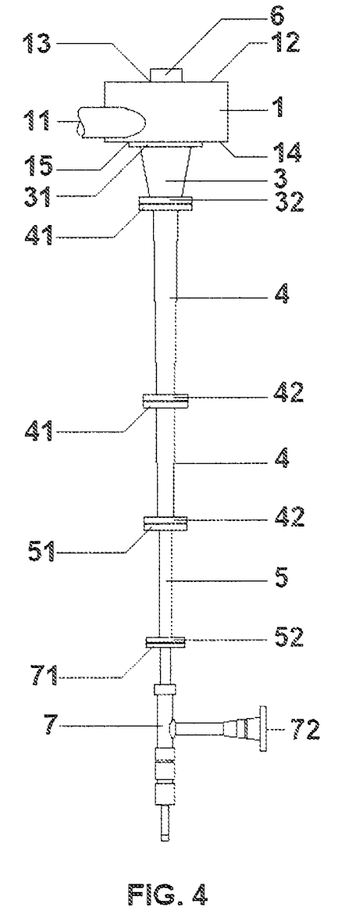
FIG. 4 is a representation of a second embodiment of a hydrocyclone, according to the present invention, suitable for the separation of a fluid flow having low oil content.
Figure 5:
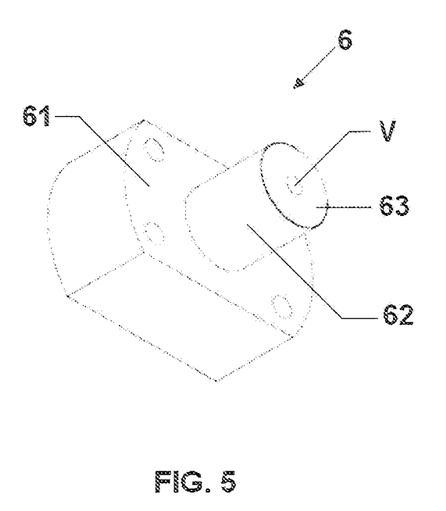
FIG. 5 is a representation of a first light phase outlet control device suitable for a fluid flow having low oil content.

An embodiment of the hydrocyclone of the present invention for fluid streams having low oil content may be observed with the assistance of FIG. 4, possessing the same components of the foregoing embodiment and additionally comprising:

a second light phase outlet control device (6) in the form of an interchangeable part having substantially rectangular base (61) with central hollow (V) cylindrical prolongation (62) in a plurality of different diameters, shown in a suggested possible embodiment in FIG. 5, wherein cylindrical prolongation (62) has external diameter (63) suitable for insertion into light phase outlet orifice (13) (overflow) permitting, by means of a specific diameter, a selection of the hydrodynamic characteristics of the hydrocyclone and to adapt at the range of use thereof in accordance with a fluid stream;

a needle valve (7) connected by a seventh flange (71) to the sixth flange (52) of final cylindrical section (5), manually adjustable, serving to restrict the outlet flow of the heavier phase such as to adjust the point of greatest operating efficiency for the hydrocyclone and constituting new lower outlet (72) (underflow).

Equal diametrically opposed curved channels (18) of feed head (16) promote a lower degree of rupture of drops of the dispersed phase through reduction in the values of turbulent kinetic energy, turbulent dissipation and shear stresses.

For the embodiment of the hydrocyclone for processing fluids having low oil content, adjustment of needle valve (7) produces a light phase outlet flow, even when maintenance of high intensity centrifugal fields is necessary with very low pressure in this outlet region (upper outlet-overflow) which may cause a reflux phenomenon through the upper outlet.

Whilst the present invention has been described in the form of the preferred embodiment thereof, the principal concept guiding the present invention, hydrocyclone type separator equipment of small dimensions and high fluid processing capacity by virtue of structural characteristics introduced into the feed, into the upper outlet orifice (overflow) and into the lower outlet (underflow), has been maintained in respect of the innovative character thereof, wherein persons of ordinary skill in the art will be able to devise and put into practice possible variations, modifications, alterations, adaptations and similar, appropriate and compatible with the field of work in question, without nevertheless departing from the scope of the present invention, represented by the following claims.

The invention claimed is:

1. A hydrocyclone having a capacity to process a fluid stream having high oil content and medium oil content, the hydrocyclone comprising:
   a fluid feed section, the fluid feed section being substantially cylindrical and having at least one tangential fluid inlet, wherein
      the fluid feed section is closed in an upper circular surface thereof,
      the fluid feed section has an outlet orifice for overflow in a central region for a light phase outlet,
      the fluid feed section is partly closed at its lower circular surface whereon, in the central region, a seat for connecting a flange is disposed, and
      the fluid feed section houses a feed head having a cylindrical ring shape of smaller dimensions than the fluid feed section, such that there is an annular space between a side wall of the fluid feed section and an external surface of the feed head, and such that there are at least two equal channels, opposed diametrically and curved, extending from the external surface of the feed head to an internal surface of the feed head in a radial direction of the feed head,
      wherein a transversal cross sectional area of said two equal channels gradually diminishes and is configured to accelerate the fluid stream in a moderate manner and to introduce the fluid stream into the fluid feed section;
   a first light phase outlet control device being a hollow interchangeable device comprising at least two diameters, one of the at least two diameters being an external diameter suitable for insertion into the outlet orifice for overflow, the first light phase outlet control device being configured to permit a selection of hydrodynamic characteristics of the hydrocyclone and to adapt the hydrocyclone to a use thereof in accordance with the fluid stream;
   an acute conical section having
      a first flange with a first larger internal opening having a first diameter being connected to a seat of the fluid feed section, and a second flange with a second smaller internal opening having a second diameter, the second diameter being smaller than the first diameter, wherein the acute conical section is configured to initiate formation of a vortex of the accelerated fluid stream within the feed head;

at least one moderate conical section having a third flange with a third larger internal opening having a third diameter, the third flange being connected to the second flange of acute conical section, and a fourth flange with a fourth smaller internal opening having a fourth diameter, wherein the at least one moderate conical section has a length in an axial direction of the hydrocyclone larger than a length of the acute conical section in the axial, and wherein the at least one moderate conical section is configured to propagate the vortex; and a final cylindrical section having a fifth flange with a fifth internal opening having a fifth diameter, the fifth flange being connected to the fourth flange of the at least one moderate conical section, and a sixth flange with a sixth internal opening having a sixth diameter, wherein the fifth diameter is equal to the sixth diameters, wherein the final cylindrical section is configured to remove a heavier phase through lower outlet for underflow.

2. The hydrocyclone according to claim 1, wherein the at least two equal channels are configured to inhibit rupture of drops of a dispersed phase of the fluid stream through reduction of turbulent kinetic energy, turbulent dissipation and shear stresses.

3. A hydrocyclone having a capacity to process a fluid stream having a low oil content, the hydrocyclone comprising:

a fluid feed section, the fluid feed section being substantially cylindrical and having at least one tangential fluid inlet, wherein the fluid feed section is closed in an upper circular surface thereof, the fluid feed section has an outlet orifice for overflow in a central region for a light phase outlet, the fluid feed section is partly closed at its lower circular surface whereon, in the central region, a seat for connecting a flange is disposed, and the fluid feed section houses a feed head having a cylindrical ring shape of smaller dimensions than the fluid feed section, such that there is an annular space between a side wall of the fluid feed section and an external surface of the feed head, and such that there are at least two equal channels, opposed diametrically and curved, extending from the external surface of the feed head to an internal surface of the feed head in a radial direction of the feed head, wherein a transversal cross sectional area of said two equal channels gradually diminishes and is configured to accelerate the fluid stream in a moderate manner and to introduce the fluid stream into the fluid feed section;

a first light phase outlet control device being a hollow interchangeable device comprising at least two diameters, one of the at least two diameters being an external diameter suitable for insertion into the outlet orifice for overflow, the hollow interchangeable device being configured to permit a selection of hydrodynamic characteristics of the hydrocyclone and to adapt the hydrocyclone to a use thereof in accordance with the fluid stream;

a second light phase outlet control device being an interchangeable part having a substantially rectangular base with a central hollow cylindrical prolongation wherein the cylindrical prolongation has an external diameter suitable for insertion into the outlet orifice for overflow, the second light phase outlet device being configured to permit a selection of hydrodynamic characteristics of the hydrocyclone and to adapt the hydrocyclone to a use thereof in accordance with a fluid stream;

an acute conical section having a first flange with a first larger internal opening having a first diameter being connected to a seat of the fluid feed section, and a second flange with a second smaller internal opening having a second diameter, the second diameter being smaller than the first diameter, wherein the acute conical section is configured to initiate formation of a vortex of the accelerated fluid stream within the feed head;

at least one moderate conical section having a third flange with a third larger internal opening having a third diameter, the third flange being connected to the second flange of acute conical section, and a fourth flange with a fourth smaller internal opening having a fourth diameter, wherein the at least one moderate conical section has a length in an axial direction of the hydrocyclone larger than a length of the acute conical section in the axial, and wherein the at least one moderate conical section is configured to propagate the vortex;

a final cylindrical section having a fifth flange with a fifth internal opening having a fifth diameter, the fifth flange being connected to the fourth flange of the at least one moderate conical section, and a sixth flange with a sixth internal opening having a sixth diameter, wherein the fifth diameter is equal to the sixth diameters; and a needle valve connected by a seventh flange to the sixth flange of final cylindrical section, the needle valve being manually adjustable and configured to restrict an outlet flow through a lower outlet for underflow.

4. The hydrocyclone according to claim 3, wherein the needle valve is configured to maintain the outlet flow while a high intensity vortex is created within the hydrocyclone.

* * * * *